May 9, 1933.     L. E. POOLE     1,907,576
GROOVE CUTTING MACHINE
Filed Aug. 6, 1931     6 Sheets-Sheet 3

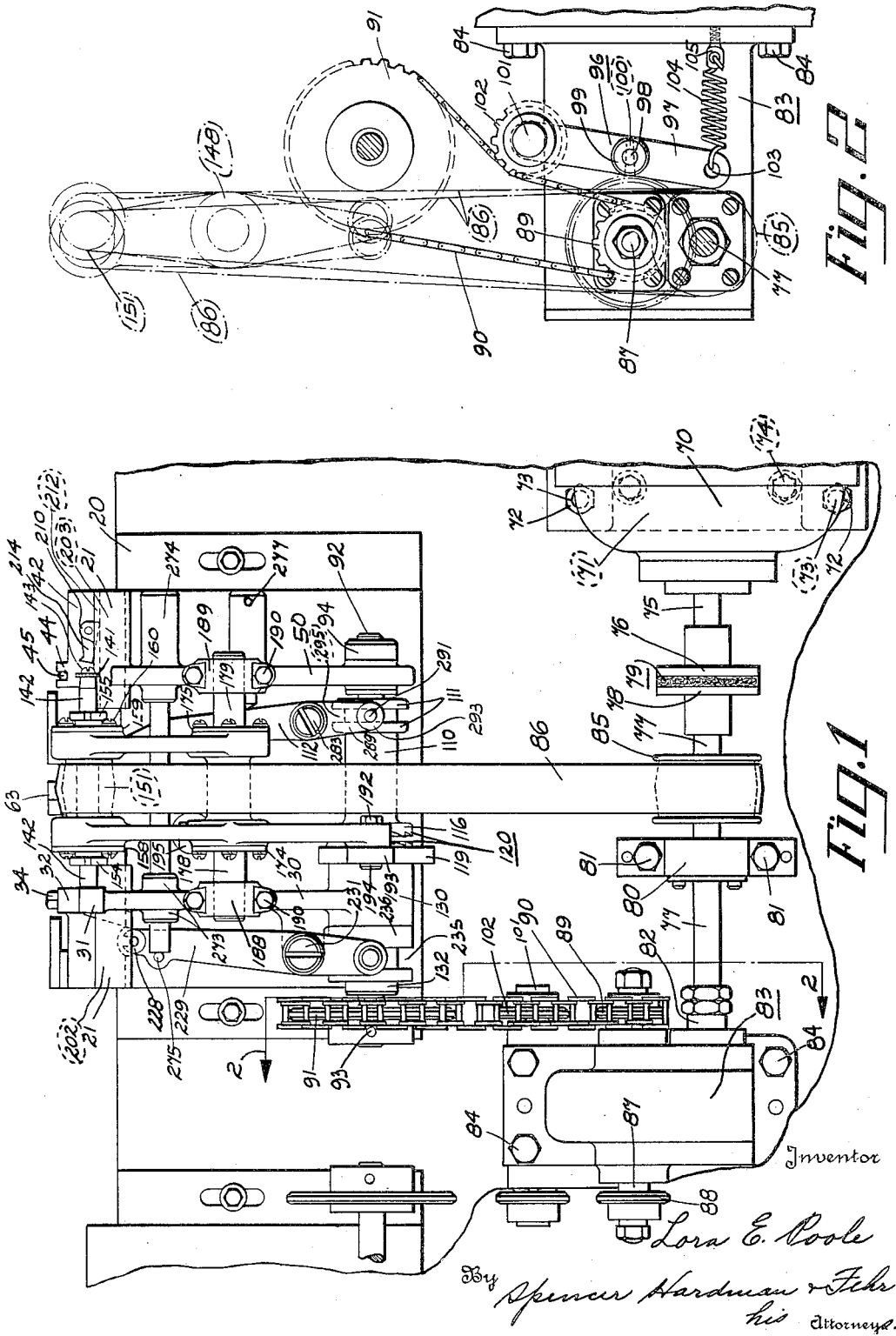
May 9, 1933.  L. E. POOLE  1,907,576
GROOVE CUTTING MACHINE
Filed Aug. 6, 1931   6 Sheets-Sheet 1

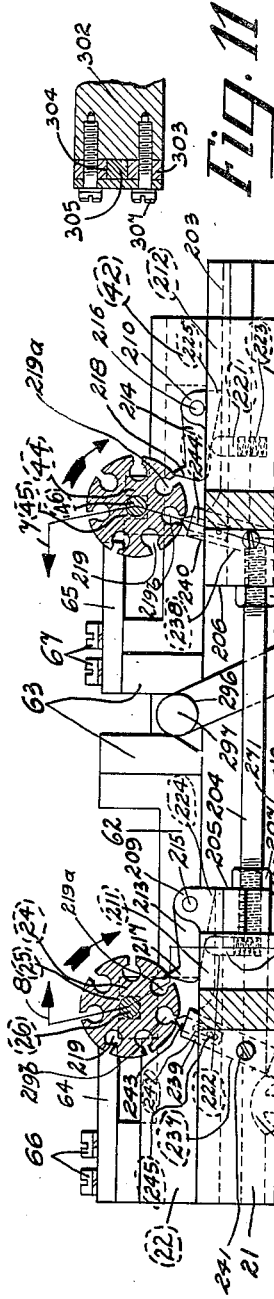

Inventor
Lora E. Poole
By Spencer Hardman & Fehr
his Attorneys

May 9, 1933.  L. E. POOLE  1,907,576
GROOVE CUTTING MACHINE
Filed Aug. 6, 1931   6 Sheets-Sheet 4

Inventor
Lora E. Poole
by Spencer Hardman and Fehr
his Attorneys

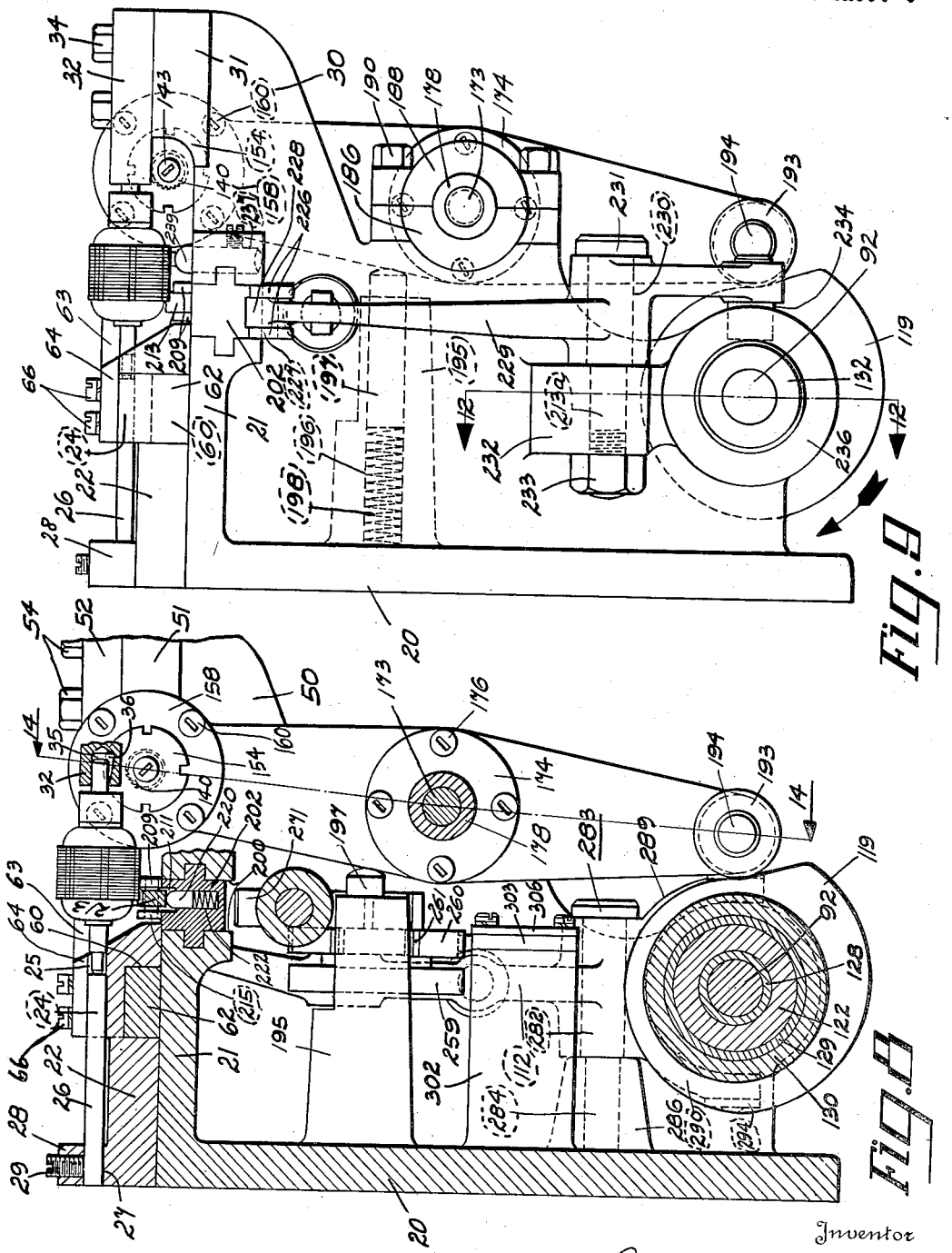

May 9, 1933. L. E. POOLE 1,907,576
GROOVE CUTTING MACHINE
Filed Aug. 6, 1931  6 Sheets-Sheet 6

Inventor
Lora E. Poole
By Spencer Hardman and Fehr
his Attorneys

Patented May 9, 1933

1,907,576

UNITED STATES PATENT OFFICE

LORA E. POOLE, OF ANDERSON, INDIANA, ASSIGNOR TO DELCO-REMY CORPORATION, OF ANDERSON, INDIANA, A CORPORATION OF DELAWARE

GROOVE CUTTING MACHINE

Application filed August 6, 1931. Serial No. 555,537.

This invention relates to a machine for cutting longitudinal grooves into the peripheries of work pieces, and in particular to a machine for cutting grooves into a conducting ring moulded around a bakelite hub in order to form a commutator.

A plurality of groove cutting operations for each work piece automatically succeed upon manual starting of the machine and the indexing of the work piece automatically takes place between groove cutting operations. The machine, once started, completes all the operations which it is adapted to perform and cannot be stopped at random at any time nor can the work pieces be removed from the work holder, but the machine will automatically stop upon cutting of the last grooves and only then the work pieces can be removed by the operator of the machine.
In order to accomplish this the present invention provides a work holder for rotatably supporting a work piece; means for maintaining the work piece within the work holder, a driving mechanism for actuating the machine; means for connecting the machine with the driving mechanism, a cutting tool; means effecting relative movement between the work piece and the cutting tool for cutting the grooves; indexing means for causing relative movement between the work piece and the cutting tool, means for actuating the indexing means; and a control means for causing the maintaining means to be effective until the last groove has been cut, and for controlling disengagement of the machine from the driving mechanism.

The present invention furthermore provides a machine which is simple in construction, reliable in operation, foolproof and last but not least, independent of human skill.

Further objects and advantages of the present invention will be apparent from the following description, reference being had to the accompanying drawings wherein a preferred embodiment of one form of the present invention is clearly shown.

Fig. 1 is a reduced fragmentary front elevation showing two machines of the present invention coupled to a common driving mechanism.

Fig. 2 is a sectional view of the speed reducing gear box, taken on the line 2—2 of Fig. 1; the end positions of the oscillatory saws carrying frame and of the saws driving belt are shown in dot-and-dash lines.

Fig. 3 is a sectional view of the machine taken on the line 3—3 of Fig. 6, and shows the machine in rest position; the saws carrying frame has been omitted for the sake of clearness of the drawing.

Fig. 8 is a sectional view of the machine, taken on the line 8—8 of Fig. 3; the saws carrying frame however, has been added.

Fig. 9 is another side elevation of the machine as indicated by arrow 9 of Fig. 3, the saws carrying frame having been added.

Fig. 10 is a fragmentary sectional view taken on the line 10—10 of Fig. 3.

Fig. 11 is a fragmentary sectional view taken on the line 11—11 of Fig. 10.

*Workholder*

Figure 4:
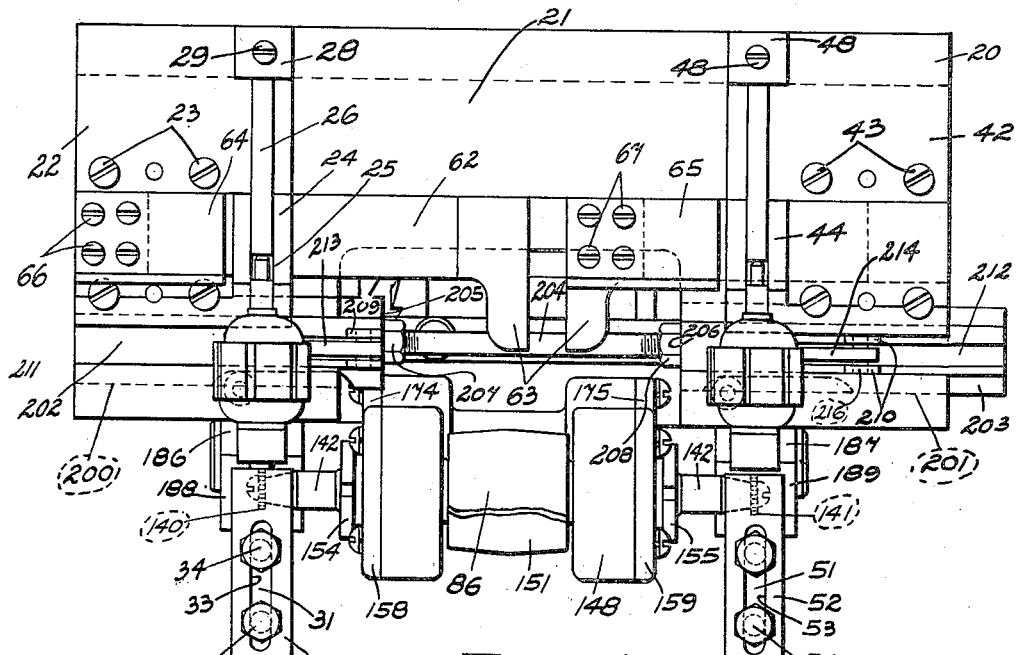
Fig. 4 is a plan view of the machine in rest position.
Figure 5:
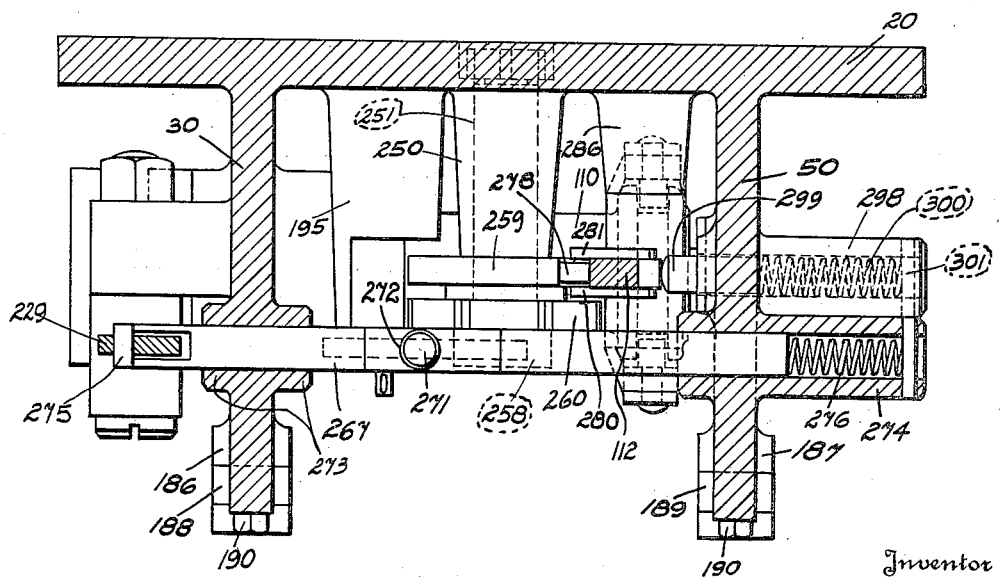
Fig. 5 is a sectional view taken on the line 5—5 of Fig. 3.
Figure 7:
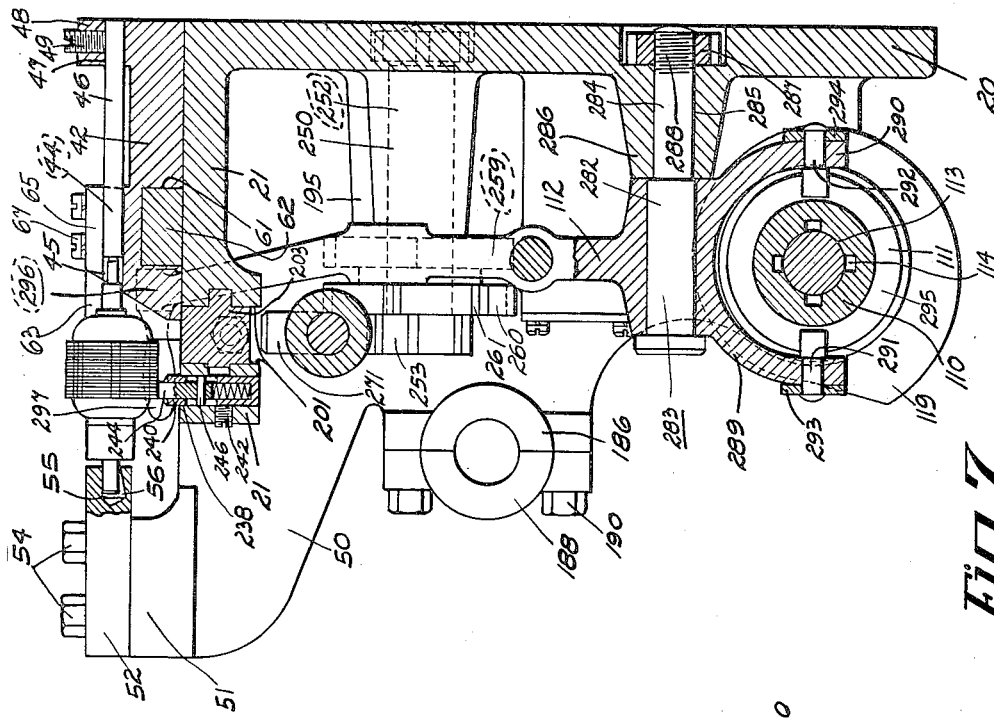
Fig. 7 is a sectional view taken on the line 7—7 of Fig. 3.
Figure 6:
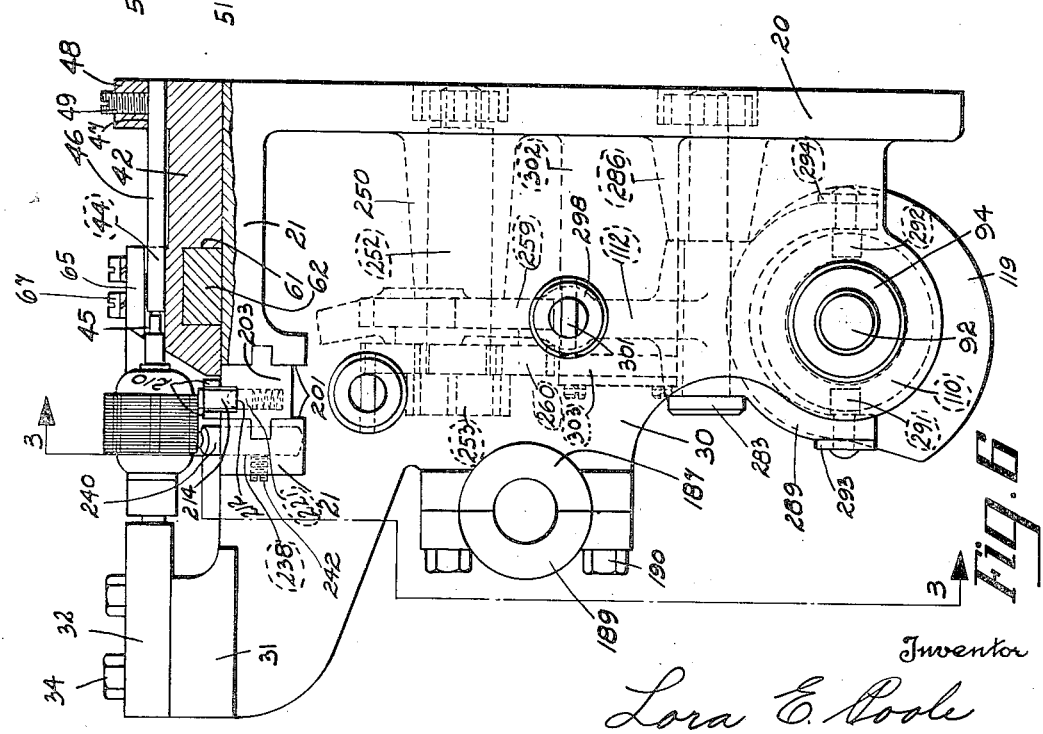
Fig. 6 is a side elevation of the machine as indicated by arrow 6 of Fig. 3, with certain parts being partially shown in section and the saws carrying frame being omitted for the sake of clearness.

Referring to the drawings the numeral 20 designates a support secured to a wall in any suitable manner, which provides a platform 21 adapted to support a square plate 22 which is secured thereto by screws 23. The plate 22 provides an elevated portion 24, having a rectangular groove 25 for receiving the one end of a stop bar 26, the other end of which projects through a hole 27 in a lug 28 growing out of the plate 22, and is secured in any desired position by a set screw 29. A rib 30 integral with the support 20 terminates into a flange 31 adapted to support a bar 32, having an oblong slot 33 for allowing adjustment of the bar 32 relative to a plurality of hold down bolts 34. The bar 32 has a hole 35 which is in alignment with the groove 25 and adapted to rotatably support one end of the work piece, while the other end is rotatably supported within the groove 25 of the plate 22. Axial thrust of the work piece toward the stop 26 is taken up by the stop 26 itself. In order to facilitate the inserting of work pieces into the work holder for rotatably supporting the same, the hole 35 of the bar 32 provides an inclined portion 36 which enables the operator of the machine to shift the proper end of the work piece into the hole 35 while holding the work piece in an inclined position with respect to the axis of the said hole; the operator thereupon lowers the other end into the groove 25. It is obvious by now that the work piece could not be inserted into the work holder in any other manner than the one explained, and consequently there is only one possible manner of taking it out of the work holder which is the same, only in reverse order, as that for inserting a work piece.

The platform 21 is also adapted to support another square plate 42 which is secured thereto by screws 43. The plate 42 provides similar to plate 22 and elevated portion 44, having a rectangular groove 45 for receiving the one end of a stop bar 46, which other end projects through a hole 47 in a lug 48 growing out of the plate 42, and is secured in any desired position therewith by a set screw 49. A rib 50 integral with the support 20 and parallel to the rib 30 terminates into a flange 51 adapted to support a bar 52, having an oblong slot 53 for allowing adjustment of the bar 52 relative to a plurality of hold down bolts 54. The bar 52 has a hole 55, being in alignment with the groove 45 and adapted to rotatably support one end of a second work piece while the other end thereof is rotatably supported within the groove 45 of the plate 42. The hole 55 provides an inclined portion 56 in substantially the same manner as the hole 35 of the bar 32 and for substantially the same purpose; the workpiece is inserted by the operator in exactly the same manner as has been explained already with reference to the first described workholder. Further explanations with respect to the second workholder are therefore deemed unnecessary.

*Means for maintaining the workpiece within the workholder*

Slidable on top of the platform 21 and guided for longitudinal movement within grooves 60 and 61 of the plates 22 and 42, respectively, is a slide 62 providing a bifurcated intermediate portion 63 adapted to receive therein a member for actuating the slide as will be explained later. The slide 62 carries a pair of horizontally extending plates 64 and 65 which are secured thereto by bolts 66 and 67, respectively, and adapted to slide on top of the elevated portions 24 and 44 of the plates 22 and 42, respectively, and in particular across the grooves 25 and 45, respectively, in order to maintain the ends of the workpieces within the said grooves. It is therefore obvious that removal of the workpieces is impossible when the slide 62 is covering the said grooves, since the lifting of the one end of the grooves 25 or 45 is an act precedent to their removal.

*Driving mechanism for actuating the machine*

Referring more particularly to Figs. 1 and 2 an electric motor 70 is secured to a base plate 71 by nuts 72 threaded upon studs 73 carried by the base plate 71, the latter in turn is secured to the wall by bolts 74. The short end of the motor shaft 75 carries one clutch half 76 while the one end of another shaft 77 carries the other clutch half 78 of a yielding clutch 79 of any well known type. The shaft 77 is journalled within a ball bearing bracket 80 secured to the wall 19 by bolts 81, and rigidly connected in any suitable manner with one end of the high speed shaft 82 of a gear box 83, which is secured to the wall by bolts 84 and drivingly connected in any suitable manner with a pulley 85 for transmitting motion to a driving belt 86 which turns the saws as will be explained later.

The gear box 83 which is of any well known type reduces the high rotary speed of the motor which is necessary for driving the saws, so as to utilize the motor also for the much slower moving actuating and control means of the machine as will be seen in the course of the description of the machine. A shaft 87 of the gear box 83 which is driven at reduced speed carries a sprocket wheel 88 and 89 at each end; each of these sprocket wheels is adapted to drive one machine of the described character. Since only one machine has been described so far, no further reference will be had to the second machine which is indicated at the left hand end of Fig. 1, but it will be understood that in the simple manner as indicated in Fig. 1 two machines of the described character may be driven by one speed reducing gear box and one electric motor; then the other end of the shaft 82 would of course be drivingly connected with a shaft similar to shaft 77 for driving the saws of the other machine, which illustration could not be shown in Fig. 1 for lack of room.

The sprocket wheel 89 drives a chain 90 which in turn drives a larger sprocket wheel 91 for further reducing the rotary speed of the driving sprocket 89. The sprocket wheel 91 is secured to a main cam shaft 92 by a tapered pin 93 as clearly shown in Fig. 12. The right hand end of the main cam-shaft 92 is journalled in a bushing 93a which is pressfitted into an enlarged portion of the rib 50. An adjustable collar 94 is secured to the right hand end of the cam shaft 92 by a set screw 95 and takes up the thrust of the said shaft in one direction (see Fig. 3). The second bearing for the main cam shaft will be described later in connection with means to be described under the next heading.

A tensioning device 96 comprises a lever 97 pivoted about a stud 98 pressfitted into the gear box 83, and retained in such position by a collar 99 which is secured to the stud 98 by a pin 100 or in any other suitable manner. The one end of the lever 97 provides a projecting stud 101 for rotatably supporting a sprocket wheel 102, which is retained in such position in any suitable manner and adapted to mesh with the chain 90, while the other end provides a hole 103 adapted to receive the one end of a tensioning spring 104, which other end is secured to an eyebolt 105, threaded into the base of the gear box 83. It is obvious that the spring 104 will cause the sprocket wheel 102 to move in such direction which results in a tensioning of the otherwise loose chain 90.

*Means for connecting the machine with the driving mechanism*

Figure 12:
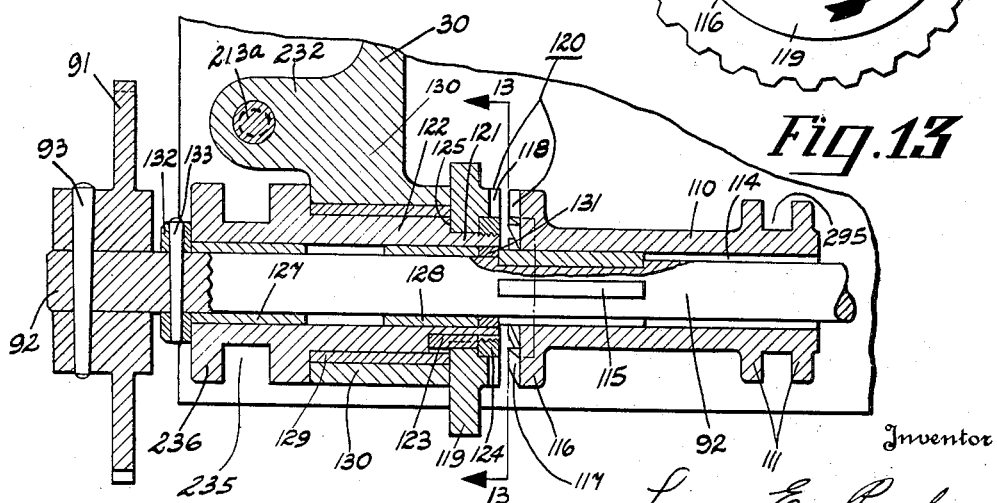
Fig. 12 is a fragmentary sectional view taken on the line 12—12 of Fig. 9.

Referring more particularly to Fig. 12 a sleeve 110 terminates with one end into a grooved collar 111, adapted to transmit an arcuate motion of a shifter fork 112 to the longitudinally slidable sleeve 110. The sleeve 110 provides a central bore 113 with four equally spaced internal grooves 114, adapted to receive the splines 115 of the cam shaft 92 which are secured thereto in any suitable manner.

The sleeve 110 terminates with its other end into a flange 116, into the face of which are cut a plurality of claws 117 adapted to engage a plurality of claws 118 cut into the opposing face of a cam-wheel 119. The flange 116 and the cam-wheel 119 thus together form a clutch 120. A reduced portion 121 of another sleeve 122 is keyed to the cam-wheel 119 as at 123 and a ring 124 is threaded upon the reduced portion 121 for retaining the cam wheel 119 against an annular shoulder 125, formed by the step from the outside diameter of the sleeve 122 to the diameter of its reduced portion 121. The sleeve 122 pressfittedly receives within its center bore 126 two short bushings 127 and 128 which are rotatably mounted upon the main cam shaft 92; the sleeve 122 itself is rotatably supported within a bushing 129 which is pressfitted into an enlarged portion 130 of the rib 30. A wear ring 131 of hardened steel interposes the opposing ends of the hardened splines 115 and of the soft bushing 128, thus preventing wearing of the splines 115 in the bushing 128. A collar 132 is secured to the cam shaft 92 by a pin 133 (see Fig. 12) and takes up the thrust of the said shaft in a direction opposite to that which is taken up by the adjustable collar 94.

From this it can be readily understood in which manner the unexplained second bearing for the cam shaft 92 is provided. The sleeve 122 is in fact the second bearing of the shaft 92 although the said sleeve is rotatable within the bushing 129.

The driving clutch half which includes the longitudinally shiftable sleeve 110 may engage the driven clutch half which includes the cam-wheel 119 and thus drive the said cam-wheel and therewith the sleeve 122. The rotary movement of the cam-wheel 119 and of the sleeve 122 results in various operations of the different parts of the machine as will appear later.

*Cutting tool and means for actuating the same*

Figure 14:
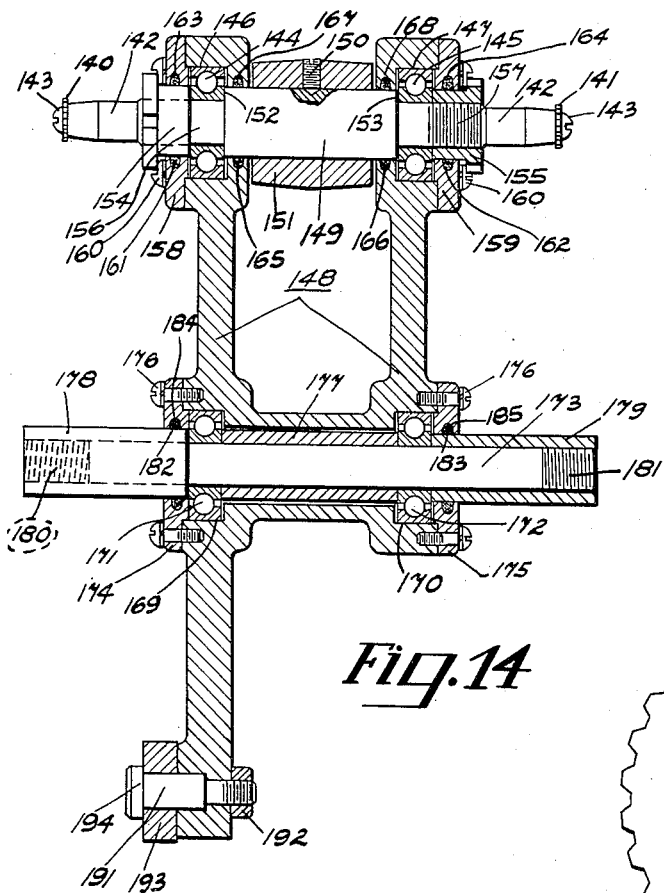
Fig. 14 is a sectional view of the saws carrying member alone and is taken on the line 14—14 of Fig. 8.

Referring now more particularly to Fig. 14, two annular saws 140 and 141, one for each work holder, are secured to the ends of a shaft 142 by screws 143 or in any other suitable manner, which is journalled within a pair of ball bearings 144 and 145, located in annular recesses 146 and 147, respectively, of a saws carrying frame 148. An enlarged portion 149 of the shaft 142 has secured thereto by a set screw 150 a pulley 151 which is continuously driven by the belt 86. Two annular shoulders 152 and 153, formed by the step-down from the diameter of the enlarged portion 149 to the normal diameter of the shaft 142, abut the ball bearings 144 and 145, while ball bearing retainers 154 and 155, respectively, are threaded upon slightly enlarged portions 156 and 157, respectively, of the shaft 142 and retain the said ball bearings 144 and 145 in engagement with the shoulders 152 and 153, respectively, of the shaft 142. Cover plates 158 and 159 surround the retainers 154 and 155, respectively, and are secured to the frame 148 by screws 160. Felt rings 161 and 162 in grooves 163 and 164, respectively, of the cover plates 158 and 159, respectively, prevent oil from leaking to the outside and prevent dust etc., from entering the ball bearings. Similarly, felt rings 165 and 166, located in grooves 167 and 168, respectively, of the bracket 148 prevent leaking of oil and entering of dust from and into the ball bearings.

The saws carrying frame 148 provides another pair of annular recesses 169 and 170, adapted to support ball bearings 171 and 172, respectively, which rotatably support a shaft 173. Two cover plates 174 and 175, secured to the frame 148 by screws 176 retain the ball bearings 171 and 172, respectively, within the provided recesses 169 and 170 of the frame 148. A tube 177 is interspaced between both ball bearings 171 and 172, while tubes 178 and 179 are threaded upon the ends 180 and 181, respectively, of the shaft 173 and adapted to bear against the ball bearings 171 and 172, respectively, in order to prevent longitudinal movement of the shaft 173 relative to the said ball bearings, which enable the saws carrying frame to oscillate in one plane. Felt rings 182 and 183 located within annular grooves 184 and 185 in the cover plates 174 and 175, respectively, prevent oil in the recesses 169 and 170 from leaking to the outside and also prevents dust from entering these recesses. The shaft 173 is with its two tubular spacers 178 and 179 received in any desired position by two bearings 186 and 187, respectively, provided by the two ribs 30 and 50, respectively, and clamped to the said bearings by bearing caps 188 and 189, respectively, which are secured thereto by bolts 190.

The saws carrying frame 148 also supports a pivot 191 which is secured thereto by a nut 192 and adapted to rotatably support an anti-friction roller 193 which is retained in position by the head 194 of the pivot 191. The anti-friction roller 193 is adapted to ride over the periphery of the cam-wheel 119 (see Figs. 8 and 13), which imparts during one complete revolution one oscillation to the frame 148. The oscillatory movement of the saws carrying frame 148 is divided into a slow advance movement for cutting the grooves, which movement is controlled by the gradually rising lobe a—b, and into an abrupt retracting movement for returning the saw into retracted position, which movement is controlled by the abruptly descending lobe b—a of the counter clockwise turning camwheel 119.

Referring now to Figs. 8 and 9 the support 20 provides a boss 195, having a recess 196 for receiving a plunger 197 and a spiral spring 198 for urging the plunger 197 into engagement with the frame 148 and thereby maintaining the antifriction roller 193 in engagement with the camwheel 119.

It must be understood that the oscillatory movement of the frame 148 does not in the least disturb the continuous drive of the saws by the bolt 86 since the belt easily gives enough, so that in the most unfavorable case, to wit when the saw is in an uppermost position the belt will not be overtensioned. Furthermore, the arrangement of the saws driving belt is such that in either end position of the oscillatory frame 148 the continuously driving belt 86 will not touch the said frame as clearly indicated in Fig. 2 by dot-and-dash lines.

*Indexing means and means for actuating the same*

The platform 21 of the support 20 provides tracks 200 and 201 for slidably supporting slides 202 and 203, respectively, which are adjustably connected by a rod 204, threadedly received by the opposing faces 205 and 206 of the slides 202 and 203, respectively, and secured in adjusted position by lock nuts 207 and 208, respectively. The slides 202 and 203 provide lugs 209 and 210; grooves 211 and 212 are cut into the top of the slides 202 and 203 and between their respective lugs 209 and 210 for receiving pawls 213 and 214, respectively, which are pivoted about pins 215 and 216, carried by the lugs 209 and 210, respectively. Each pawl 213 and 214 has a double sloped end 217 and 218, respectively, adapted to enter any of the notches 219 of the workpieces and transmit motion to these workpieces which is equal to the distance between two successive notches 219. Spring pressed plungers 220 and 221, slidable within recesses 222 and 223 of the slides 202 and 203, respectively, yieldingly maintain the free ends 217 and 218 of the pawls 213 and 214 in an uppermost position, which is reached when the said pawls are prevented from further clockwise rotation against the tension of the said spring pressed plungers upon engagement of the lowermost edges 224 and 225 of the pawls 213 and 214, respectively, with the bottom of the grooves 211 and 212, respectively.

The slide 202 provides on the bottom a notched lug 226 adapted to pressfittedly receive a pin 227 at both ends, which free intermediate portion projects between the bifurcated end 228 of a shifter lever 229, pivoted about the blank portion 230 of a bolt 231 (see Fig. 9) which slightly reduced portion 213a is received by a hole in a boss 232, projecting from the support rib 30, and secured in position, by a lock nut 233 received by the threaded end of the bolt 231.

The lower end of the shifter lever 229 carries a stud 234, projecting into a camrace 235 in the periphery of a collar 236 of the sleeve 122, and is adapted to impart motion from the camrace 235 to the shifter lever 229, and therewith to the slides 202 and 203 with the indexing pawls 213 and 214, respectively.

The platform 21 of the support 20 also provides two holes 237 and 238 which axis are directed radially with respect to the workpieces in the workholders. These holes 237 and 238 receive shells 239 and 240, respectively, held in adjusted position by set screws 241 and 242 respectively, and slidably supporting spring pressed plungers 243 and 244, respectively which longitudinal travel is, however, limited by pins 245 and 246, sticking through the plungers 243 and 244, respectively, and projecting their free ends into slots 247 and 248, of the shells 239 and 240, respectively. The spring pressed plungers have double sloped ends which are adapted to enter the notches 219 of the workpieces in order to arrest them against rotation, when the indexing means is ineffective.

Control means

Referring more particularly to Figs. 3 and 10 a boss 250, extending from the support 20 has a bore 251 adapted to rotatably support a shank 252 of a ratchet wheel 253. The shank 252 has a reduced threaded portion 254 adapted to receive a nut 255 which prevents longitudinal wandering of the said shank within the boss 250. Interposed between the ratchet wheel 253 and the ends of the boss 250, and keyed to the shank 252 as at 257 is a controlwheel 258, including a cam 259 and a flange 260, having equally spaced notches 261 in the periphery thereof, which number is equal to the number of grooves to be cut into the periphery of the workpieces.

The ratchet wheel 253 also has as many ratchets as there are grooves to be cut into the workpieces. A catch 262, adapted to engage the ratchets and turn the ratchet wheel 253 is pivoted as at 264 between two lugs 265 and 266 of a rod 267 and located within a groove 268 thereof. A spring pressed plunger 269, guided within a bore 270 of the rod 267, which bore extends into a cage 271, welded to the rod 267 as at 272, constantly urges the catch 262 into engagement with the ratchet wheel 253. The one end of the rod 267, slidably supported within bosses 273 and 274, extending from the ribs 30 and 50, respectively, is constantly in engagement with a pin 275, carried by the shifter lever 229 due to the tension of a spring 276 in a hole of the boss 274 which spring is retained in tensioned position by a pin 277, carried by the boss 274. The cam 259 of the control wheel 258, which is rotatable with the ratchet wheel 253 is adapted to be engaged by a cam follower 278, pivoted at 279 and located between lugs 280 and 281 provided by the shifter lever 112. This lever 112 is pivoted about the blank portion 282 of a bolt 283, having a reduced portion 284, extending through a hole 285 of a boss 286 of the support 20, and secured in such position by a nut 287, which is received by the threaded end 288 of the reduced portion 284. The lever 112 terminates at one end into a yoke having arms 289 and 290, which carry diametrically opposed studs 291 and 292, respectively, riveted with their outer ends to steel washers 293 and 294, respectively, while their inner enlarged portions project into the annular groove 295 in the periphery of the collar 111 of the sleeve 110. The other end of the lever 112 terminates into a cylindrical boss 296, which provides an axially extending handle 297. The cylindrical boss 295 projects into the bifurcation formed by the bifurcated portion 63 of the slide 62 and imparts motion from the lever 112 to the slide 62. The rib 50 provides another boss 298 similar to the boss 272, for slidably supporting a spring pressed plunger 299, the actuating spring 300 of which is retained in tensioned position by a pin 301, carried by the boss 298. The plunger 299 is adapted to engage the lever 112 and constantly maintain the cam follower 278 thereof in engagement with the cam 259 of the controlwheel 258.

The support 20 has still another projecting boss 302 immediately below the boss 250 which supports a plate 303, having a slot 304, in which a spring pressed plunger 305 is confined to longitudinal movement only. A plate 306 covers the slotted plate 303 entirely and a plurality of screws 307 secure the cover plate 306 as well as the slotted plate 303 to the boss 302. The projecting end of the plunger 305 is double sloped as at 308 and adapted to enter the notches 261 of the flange 260 of the controlwheel 258 in order to yieldingly resist rotation of the said controlwheel. The depth of the notches 261, the degree of slope of the double sloped end 308 of the plunger 305 and the force of the spring pressed plunger 305 have been so selected that only the catch 262 can overcome the yielding resistance of the spring pressed rotation of the controlwheel 258 when the said catch positively engages one of the ratchets of the ratchet wheel 253 and is then moved with the rod 267.

Mode of operation

Supposing the machine is in rest position, the saws carrying frame 148 will then be in the one end position of its oscillatory movement as featured in Fig. 8. The slide 62 with its two workpiece maintaining plates 64 and 65 will not cover the grooves 25 and 45, but will be in withdrawn position as shown in Figs. 3 and 4. The slides 202 and 203 which carry the indexing pawls 213 and 214, respectively, are in the position as shown in Fig. 3, ready to index the workpieces as soon as the said slides start to travel toward the left. The workholders are now open to receive workpieces. The operator takes two workpieces, shifts the one ends of the same in the earlier described manner into the holes 35 and 55 of the workholder bars 32 and 55, respectively, and lowers the other ends into the grooves 25 and 45 of the workholder plates 22 and 42. In order to locate the grooves 219 of the two workpieces relative to the indexing pawls 213 and 214, so that the first indexing of the same is not merely accidental, the operator turns the workpieces somewhat until he hears the clicking of either of the spring pressed plungers 243 and 244, when entering one of the notches 219 of either workpiece, which indicates that the particular workpiece is arrested in a position to be effected by the indexing means. The workpieces are now in a desired position with respect to the saws 140 and 141 and the first groove to be cut will be in the right position relative to the notches 219. The machine is now ready for operation.

Figure 13:
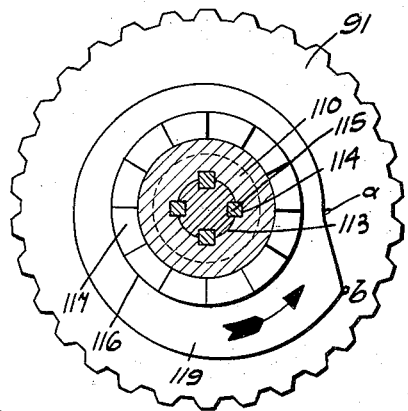
Fig. 13 is a sectional view taken on the line 13—13 of Fig. 12.

The operator thereupon shifts the handle 297 and therewith the shifter lever 112 from the position shown in Fig. 3 towards the right until the continuously rotating sleeve 110, which is moved together with and by the said lever 112, engages with its claws 117 the opposite claws 118 of the camwheel 119 and thus drives the latter and also the sleeve 122 with its camrace 235, as has been earlier explained. The relative position of the two cams 119 and 235 is such that immediately after engagement of the clutch 120 the frame 148 will be moved in response to the counter clockwise movement of the cam 119 from $a$ to $b$ as shown in Fig. 13, i. e. the continuously rotating saws will slowly approach the two workpieces and cut one groove into each of the workpieces. The camrace 235 which started to rotate coincidentally with the cam 119, at once shifts the indexing means actuating lever 229 from the position as shown in Fig. 3 to a left end position, which movement causes indexing of the workpieces by the forwardly travelling pawls 213 and 214 of the slides 202 and 203 respectively, which are actuated by the lever 229. Such movement of the lever 229 also allows the catch carrying rod 267 to follow the moving retaining pin 276, carried by the said lever, due to the tension of the spring 276. The camrace 235 reverses the direction of travel of the lever 229 right after the notches 219$a$, which have been entered into and moved by the forwardly moving pawls 213 and 214, have been engaged by the arresting spring pressed plunger 243 and 244, respectively, and after the catch 262 has dropped into a ratchet 253$a$ under the tension of the spring pressed plunger 269. The return movement of the lever 229 into the position of Fig. 3 causes its pin 275 to move the rod 267 against the tension of the spring 276. Such movement causes the ratchet wheel 253 to be turned clockwise (Fig. 3) the distance between two consecutive ratchets 253$a$ and 253$b$ for instance. This rotary movement of the ratchet wheel 253 is also imparted to the control wheel 258 through the key connection as indicated by the numeral 258 in Fig. 10, against the tension of the spring pressed plunger 305 to arrest the said control wheel by projecting into one of the notches 261 of its flange 260. Up to this time the operator had to hold the lever 112 in such position which kept the clutch 120 in engagement, but now, since the control wheel 258 is being rotated one step which is the angular distance between two adjoining ratchets 253$a$ and 253$b$ for instance, or the angular distance between two adjoining notches 261, the depression 259$a$ of the cam 259 will move from underneath the cam follower 278 of the lever 112 and the same will engage the concentric part of the periphery of the cam 259 and will maintain the lever in such position, in which it keeps the clutch engaged and the slide 62 with the plates 64 and 65 in workpiece maintaining position. The return movement of the lever 229 also causes withdrawal of the slides 202 and 203 with the pawls 213 and 214, respectively, into the position as shown in Fig. 3. The ends 217 and 218 of the pawls 213 and 214, respectively, will slip out of the moved notches 219$a$, which will now be in the position as indicated by the reference characters 219$b$, due to the arrangement of the double sloped ends 217 and 218 of the pawls 213 and 214, respectively, and also due to the arresting of the notches 219$b$ by the spring pressed plungers 243 and 244, respectively.

From this it may be understood that all of the described operations which are controlled by the camrace 235 take place before the saws 140 and 143 have engaged the work pieces. It takes the saws all that time to approach the work pieces due to the slowly rising portion $a$—$b$ of the cam 119. The period for approaching the workpieces is approximately the same as for cutting the grooves. After all the operation controlled by the camrace 235 have been completed, the saws have reached the workpieces and commence to cut the grooves.

The frame 148 will after the groove cutting operation follow the abruptly descending lobe $b$—$a$ of the rotating cam 119, which will cause a quick withdrawal of the saws 140 and 141 from the just finished grooves into the position shown in Fig. 8.

One groove has been cut, the indexing means and the saws carrying frame 148 have reached initial resting position again, but this time the cycle of operations described with reference to the cutting of the first grooves automatically repeats itself as many times in number as there are ratchets left on the ratchet wheel 253 which have not yet been moved by the catch 262. After the last catch has been moved the ratchet wheel will have been turned one complete revolution and therewith the control wheel 258 with the cam 259 also. It appears from this, that at the end of the movement of the last ratchet, i. e. after the ratchet wheel completed one revolution since the starting of the machine, the depression 259$a$ of the cam 259 will have moved underneath the cam follower 278 of the lever 112, which will drop into this depression due to the tension of the spring pressed plunger 299, and cause disengagement of the clutch 120 and withdrawal of the slide 62 with the plates 64 and 65 from maintaining position. The operator then and not before is enabled to remove the workpieces from the workholders in the earlier described manner, and afterwards insert two other workpieces into the said workholders. The operator thereupon starts the machine again in the explained manner and the cutting operations take place again automatically.

From this it may be seen that the present invention provides a machine which once started completes a plurality of groove cutting operations without further manipulation of the operator. The operator is furthermore unable to interrupt the cutting operations after the machine has been started, but the machine will automatically stop after the cutting of the last groove.

While the form of embodiment of the present invention as herein disclosed, constitutes a preferred form, it is to be understood that other forms might be adopted, all coming within the scope of the claims which follow.

What is claimed is as follows:

1. A machine for cutting a plurality of longitudinal grooves into the periphery of a workpiece, comprising in combination; a workholder for properly locating and rotatably supporting a workpiece; means movable relative to a supported workpiece for retaining the same within the workholder; a manually operable lever for moving the last said means into workpiece retaining position; a driving mechanism for actuating the machine; means for connecting the machine with the driving mechanism; a cutting tool; means effecting relative movement between the workpiece and the cutting tool for cutting the grooves; indexing means for causing relative movement between the workpiece and the cutting tool; means for actuating the indexing means; and means including a cam rotated in response to actuation of the indexing means for actuating said lever to maintaining the workpiece retaining means in retaining position, until the last groove has been cut.

2. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; manually disengaged means for drivingly connecting the driving mechanism with the machine; a manually operable lever for moving the workpiece retaining means into retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position and to prevent disengagement of the machine from the driving mechanism, until the last groove has been cut.

3. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; normally disengaged means attached drivingly to connect the driving mechanism with the machine; a manually operable lever for moving the workpiece retaining means into retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position and to prevent disengagement of the machine from the driving mechanism, until the last groove has been cut, and to effect withdrawal of the workpiece retaining means from the retaining position ineffective after the cutting of the last groove to permit the removal of the workpiece from the workholder.

4. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the workpiece retaining means into retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position and to prevent disengagement of the machine from the driving mechanism, until the last groove has been cut, and to effect disengagement of the machine from the driving mechanism, after the cutting of the last groove.

5. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position effective and to prevent disengagement of the machine from the driving mechanism, until the last groove has been cut, to effect withdrawal of the workpiece retaining means from the retaining position ineffective and disengagement of the machine from the driving mechanism, after the cutting of the last groove.

6. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; normally disengaged means adapted drivingly to connect the driving mechanism with the machine; a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain said workpiece retaining means in retaining position until the last groove has been cut, and to effect the withdrawal of the workpiece retaining means from retaining position after the cutting of the last groove.

7. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position until the last groove has been cut, and to effect disengagement of the machine from the driving mechanism, after the cutting of the last groove.

8. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to maintain the workpiece retaining means in retaining position until the last groove has been cut, to effect withdrawal of the retaining means from retaining position and to effect disengagement of the machine from the driving mechanism after the cutting of the last groove.

9. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into workpiece retaining position thereby also effecting driving engagement of the last said means; a cutting tool; means effecting movement of the cutting tool relative to the workpiece for cutting the grooves; indexing means for causing intermittent rotations of the workpiece relative to the cutting tool; means for actuating the indexing means; and a control means including a cam intermittently rotated in response to actuation of the indexing means for actuating said lever to maintain the workpiece retaining means in retaining position and to prevent disengagement of the machine from the driving mechanism, until the last groove has been cut, and to effect disengagement of the machine from the driving mechanism, after the cutting of the last groove.

10. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving means with the machine; and a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to prevent disengagement of the machine from the driving mechanism, until the last groove has been cut.

11. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; normally disengaged means adapted drivingly to connect the driving mechanism with the machine; a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam rotated in response to actuation of the indexing means for actuating said lever to prevent disengagement of the machine from the driving mechanism, until the last groove has been cut, and to effect withdrawal of the workpiece retaining means from retaining position ineffective after the cutting of the last groove.

12. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to prevent disengagement of the machine from the driving mechanism, until the last groove has been cut, and to effect disengagement of the machine from the driving mechanism, after the cutting of the last groove.

13. A machine for cutting a plurality of longitudinal grooves into the periphery of a workpiece, comprising in combination; a workholder for rotatably supporting a workpiece; means movable relative to a supported workpiece for retaining the same within the workholder; a driving mechanism for actuating the machine; disengageable means adapted drivingly to connect the driving mechanism with the machine; a manually operable lever for moving the last said means into workpiece retaining position thereby also effecting driving engagement of the last said means; a cutting tool; means effecting relative movement between the workpiece and the cutting tool for cutting the grooves; indexing means for causing relative movement between the workpiece and the cutting tool; means for actuating the indexing means; and a control means including a cam intermittently rotated in response to actuation of the indexing means for actuating said lever to prevent disengagement of the machine from the driving mechanism, until the last groove has been cut to effect withdrawal of the workpiece retaining means from retaining position and to effect disengagement of the machine from the driving mechanism, after the cutting of the last groove.

14. A machine for cutting a plurality of longitudinal grooves into the periphery of a workpiece, comprising in combination; a workholder for rotatably supporting and properly locating a workpiece; a member movable relative to a supported workpiece for retaining the same within the workholder; an electric motor for actuating the machine; a clutch connection between the machine and the electric motor, said clutch comprising two clutch halves; a manually operable lever for engaging both clutch halves thereby also moving the workpiece retaining member into retaining position; a cutting tool; means effecting relative movement between the workpiece and the cutting tool for cutting the grooves, indexing means for causing relative movement between the workpiece and the cutting tool; means for actuating the indexing means, said means being operated in response to the actuation of the means for effecting relative movement between the workpiece and the cutting tool for cutting the grooves; and a control means for causing the maintaining means including a cam intermittently rotated in response to actuation of the indexing means for actuating said lever to maintain the workpiece retaining member in retaining position and to prevent disengagement of the clutch halves, during the groove cutting operations.

15. A machine for cutting a plurality of longitudinal grooves into the periphery of a workpiece, comprising in combination; a workholder for rotatably supporting a workpiece; a member movable relative to a supported workpiece for retaining the same within the workholder; an electric motor for actuating the machine; a clutch connection between the machine and the electric motor, said clutch comprising two clutch halves; a manually operable lever for engaging both clutch halves and for moving said member into workpiece retaining position; a cutting tool; an oscillatory tool carrying frame; a cam for effecting movement of the said frame; indexing means for causing relative movement between the workpiece and the cutting tool; a cam for actuating the indexing means; and a control means including a cam intermittently rotated in response to actuation of the indexing means for actuating said lever to effect disengagement of the clutch halves and withdrawal of the workpiece retaining member from the retaining position after the cutting of the last groove.

16. A machine for cutting a plurality of longitudinal grooves into the periphery of a workpiece, comprising in combination; a workholder for rotatably supporting a workpiece; a member movable relative to a supported workpiece for retaining the same within the workholder; an electric motor for actuating the machine; a clutch connection between the machine and the electric motor, said clutch comprising two clutch halves; a manually operable lever for engaging both clutch halves and for moving said member into workpiece retaining position; a rotary cam for oscillating the tool carrying frame; indexing means for causing relative movement between the workpiece and the cutting tool; a cam for actuating the indexing means, said cam rotating in unison with the cam for moving the tool carrying frame; and a control means including a cam intermittently moved in response to actuation of the indexing means for cutting said lever to maintain the workpiece retaining member in retaining position and to prevent disengagement of the clutch halves, during the groove cutting operations, to effect disengagement of the clutch halves and withdrawal of said workpiece retaining member from retaining position after the cutting of the last groove.

17. A machine for cutting a plurality of longitudinal grooves into the periphery of a workpiece, comprising in combination; a workholder for rotatably supporting a workpiece; a slide for retaining the workpiece within the workholder; an electric motor for actuating the machine; a clutch connection between the machine and the electric motor, said clutch comprising two clutch halves; a cutting tool; an oscillatory tool carrying frame; a rotary cam for oscillating the said frame; indexing means for causing relative movement between the workpiece and the cutting tool; a cam for actuating the indexing means, said cam being rotated in unison with the cam for oscillating the tool carrying frame and one of the clutch halves; and a control means for causing the slide to be arrested in retaining position and for preventing disengagement of the clutch halves during the groove cutting operations, for controlling disengagement of the clutch halves and withdrawal of the slide from retaining position, after the cutting of the last groove.

18. A machine for cutting a plurality of longitudinal grooves into the periphery of a workpiece, comprising in combination, a workholder for rotatably supporting a workpiece; a driving mechanism for actuating the machine; means for connecting the machine with the driving mechanism; a cutting tool; means effecting relative movement between the cutting tool and the workholder for cutting the grooves; indexing means for causing relative movement between the cutting tool and the workpiece; means for actuating the indexing means; a movable member for actuating the connecting means; and a rotary cam for maintaining the last said movable member in such position in which it maintans the connecting means in connecting position during the groove cutting operations.

19. A machine for cutting a plurality of longitudinal grooves into the periphery of a workpiece, comprising in combination, a workholder for rotatably supporting a workpiece; a driving mechanism for actuating the machine; means for connecting the machine with the driving mechanism; a cutting tool;

means effecting relative movement between the cutting tool and the workholder for cutting the grooves; indexing means for causing relative movement between the cutting tool and the workpiece; means for actuating the indexing means; a movable member for actuating the connecting means; and a rotary cam for maintaining the last said movable member in such position in which it maintains the connecting means in connecting position during the groove cutting operations, and allowing the said member to move into such position in which it allows the said means to disconnect after the cutting of the last groove.

20. A machine for cutting a plurality of longitudinal grooves into the periphery of a workpiece, comprising in combination, a workholder for rotatably supporting a workpiece; an electric motor for actuating the machine; a clutch connection between the motor and the machine; a cutting tool; means effecting relative movement between the cutting tool and the workholder for cutting the grooves; indexing means for causing relative movement between the cutting tool and the workpiece; means for actuating the indexing means; a movable member for actuating the clutch; a rotary cam for maintaining the last said movable member in clutch engaging position and allowing the said member to move into clutch disengaging position after the last groove has been cut; and yielding means for moving the said member into clutch disengaging position.

21. A machine for cutting a plurality of longitudinal grooves into the periphery of a workpiece, comprising in combination, a workholder for rotatably supporting a workpiece; an electric motor for actuating the machine; a clutch connection between the motor and the machine; a cutting tool; a cam for effecting relative movement between the cutting tool and the workholder for cutting the grooves; indexing means for causing relative movement between the cutting tool and the workpiece between groove cutting operations; a cam for actuating the indexing means; a movable member for actuating the clutch; a rotary cam for maintaining the last said movable member in clutch engaging position during the groove cutting operations and allowing the said member to move into clutch disengaging position after the last groove has been cut; means for rotating the last said cam in response to the movement of the indexing means; and a spring for maintaining the said clutch actuating members in contact with the last said cam and to move the said member into disengaging position.

22. A machine for cutting a plurality of longitudinal grooves into the periphery of a workpiece, comprising in combination, a workholder for rotatably supporting a workpiece; a slide for retaining the workpiece within the workholder; an electric motor for actuating the machine; a clutch connection between the motor and the machine; a cutting tool; a cam for effecting relative movement between the cutting tool and the workholder for cutting the grooves; indexing means for causing relative movement between the cutting tool and the workpiece between groove cutting operations; a cam for actuating the indexing means; a movable member for engaging the clutch and moving the slide in retaining position or for disengaging the clutch; a rotating cam for maintaining the last said member in clutch engaging and slide arresting position, and for allowing the same member to move into clutch disengaging position after the last groove has been cut; means for rotating the last said cam in response to the movement of the indexing means; and a spring for causing the clutch engaging and disengaging member to disengage the clutch halves.

23. A machine for cutting a plurality of longitudinal grooves into the periphery of a workpiece, comprising in combination, a workholder for rotatably supporting a workpiece; a slide for retaining the workpiece within the workholder; a cutting tool; a rotary cam for effecting relative movement between the cutting tool and the workholder for cutting the grooves; indexing means for causing relative movement between the cutting tool and the workpiece between groove cutting operations; a cam for actuating the indexing means, said cam rotating in unison with the first said cam; a movable lever for engaging the clutch halves and moving the slide in workpiece retaining position, or for disengaging the clutch halves and withdrawing the slide from such workpiece retaining position; a rotary cam for maintaining the said lever in clutch engaging and slide arresting position, and for allowing the said lever to move into clutch disengaging position, thereby also causing withdrawal of the slide from workpiece retaining position after the last groove has been cut; means for rotating the last said cam in response to the movement of the indexing mechanism; and a spring for moving the clutch actuating member into clutch disengaging position and the slide away from the retaining position.

24. A machine for cutting a plurality of longitudinal grooves into the periphery of a workpiece comprising in combination, a workholder for rotatably supporting a workpiece; movable means for retaining the workpiece in the workholder; an indexing mechanism for intermittently rotating the worksupport in the workholder; an oscillatory saw carrying frame; a cam shaft; a cam on said shaft for actuating the indexing mechanism; another cam on said shaft for oscillating the saw carrying frame while the indexing mechanism is ineffective thereby cutting a groove; a source of mechanical power; a shiftable clutch adapted drivingly to connect the power source with the cam shaft; a pivotally mounted lever for simultaneously shifting the clutch into engaging position and moving the workpiece retaining means into retaining position or for simultaneously shifting the clutch into disengaging position and withdrawing the workpiece retaining means from retaining position; a ratchet wheel having the same number of equally spaced teeth as there are grooves to be cut into the workpiece; a cam rotatable with the ratchet wheel and engaging said lever, said cam having a concentric periphery interrupted once by a descent for an angular distance approximately equal to the angular distance between two successive teeth of the ratchet wheel and which when passing the lever allows the same to move into clutch disengaging position; a spring constantly urging the lever into engagement with the last said cam; and means for indexing the ratchet wheel one tooth in response to each indexing of the workpiece.

25. A machine for cutting a plurality of longitudinal grooves into the periphery of a workpiece comprising, in combination, a workholder for rotatable supporting a workpiece; movable means for retaining the workpiece in the workholder; an indexing mechanism for intermittently rotating the work-support in the workholder; an oscillating saw carrying frame; a cam shaft; a cam on said shaft for actuating the indexing mechanism; another cam on said shaft for oscillating the saw carrying frame while the indexing mechanism is ineffective thereby cutting a groove; a source of mechanical power; a shiftable clutch adapted drivingly to connect the power source with the cam shaft; a pivotally mounted lever for simultaneously shifting the clutch into engaging position and moving the workpiece retaining means into retaining position or for simultaneously shifting the clutch into disengaging position and withdrawing the workpiece retaining means from retaining position; a ratchet wheel having the same number of equally spaced teeth as there are grooves to be cut into the workpiece; a cam rotatable with the ratchet wheel and engaging said lever, said cam having a concentric periphery interrupted once by a descent for an angular distance approximately equal to the angular distance between two successive teeth of the ratchet wheel and which when passing the lever allows the same to move into clutch disengaging position; a spring constantly urging the lever into engagement with the last said cam; means for indexing the ratchet wheel one tooth in response to each indexing of the workpiece; and manual means for shifting the lever out of engagement with the descent of said cam into clutch engaging position to start a new series of groove cutting operations on a workpiece.

26. A machine for cutting a plurality of longitudinal grooves into the periphery of a workpiece comprising, in combination, a workholder for rotatably supporting a workpiece; movable means for retaining the workpiece in the workholder; an indexing mechanism for intermittently rotating the work-support in the workholder; an oscillating saw carrying frame; a cam shaft; a cam on said shaft for actuating the indexing mechanism; another cam on said shaft for oscillating the saw carrying frame while the indexing mechanism is ineffective thereby cutting a groove; a source of mechanical power; a shiftable clutch adapted drivingly to connect the power source with the cam shaft; a pivotally mounted lever for simultaneously shifting the clutch into engaging position and moving the workpiece retaining means into retaining position or for simultaneously shifting the clutch into disengaging position and withdrawing the workpiece retaining means from retaining position; a ratchet wheel having the same number of equally spaced teeth as there are grooves to be cut into the workpiece; a cam rotatable with the ratchet wheel and engaging said lever, said cam having a concentric periphery interrupted once by a descent for an angular distance approximately equal to the angular distance between two successive teeth of the ratchet wheel and which when passing the lever allows the same to move into clutch disengaging position; a spring constantly urging the lever into engagement with the last said cam; means for indexing the ratchet wheel one tooth in response to each indexing of the workpiece, the ratchet wheel being so positioned relative to the last said cam that the descent engages the lever at the end of an indexing of the ratchet wheel; and manual means for shifting the lever out of engagement with the descent of said cam into clutch engaging position to start a new series of groove cutting operations on a workpiece.

27. A machine for cutting a plurality of longitudinal grooves into the periphery of a workpiece comprising, in combination, a workholder for rotatably supporting a workpiece; movable means for retaining the workpiece in the workholder; an indexing mechanism for intermittently rotating the work-support in the workholder; an oscillating saw carrying frame; a cam shaft; a cam on said shaft for actuating the indexing mechanism; another cam on said shaft for oscillating the saw carrying frame while the indexing mechanism is ineffective thereby cutting a groove; a source of mechanical power; a shiftable clutch adapted drivingly to connect the power source with the cam shaft; a pivotally mounted lever for simultaneously shifting the clutch into engaging position and moving the workpiece retaining means into retaining position or for simultaneously shifting the clutch into disengaging position and withdrawing the workpiece retaining means from retaining position; a ratchet wheel having a number of equally spaced teeth which is a manifold of the number of grooves to be cut into the workpiece; a cam rotatable coaxially of the ratchet wheel and in unison with the same and engaging the lever, said cam having a number of concentric portions which is a manifold of the number of grooves to be cut, each of said concentric portions being interrupted by a descent for an angular distance approximately equal to the angular distance between two successive teeth of the ratchet wheel and which when passing the lever allows the same to move into clutch disengaging position; a spring constantly urging the lever into engagement with the last said cam; means for indexing the ratchet wheel one tooth in response to each indexing of the workpiece; and manual means for shifting the lever out of engagement with the descent of said cam into clutch engaging position to start a new series of groove cutting operations on a workpiece.

In testimony whereof I hereto affix my signature.

LORA E. POOLE.